United States Patent [19]
Adams

[11] 3,762,240
[45] Oct. 2, 1973

[54] RACK AND PINION ASSEMBLY

[75] Inventor: Frederick John Adams, Campton, England

[73] Assignee: Cam Gears Limited, Hertfordshire, England

[22] Filed: May 2, 1972

[21] Appl. No.: 249,629

[30] Foreign Application Priority Data
May 11, 1971 Great Britain................... 14,143/71

[52] U.S. Cl.......................... 74/498, 74/422, 308/71
[51] Int. Cl........................... F16c 25/00, F16h 1/04
[58] Field of Search...................... 74/498, 422, 409; 308/71, 238

[56] References Cited
UNITED STATES PATENTS
3,477,771  11/1969  Herbenar................ 308/71

FOREIGN PATENTS OR APPLICATIONS
1,094,120  12/1960  Germany.................. 74/498
1,194,651  6/1965  Germany................... 308/71

*Primary Examiner*—Leonard H. Gerin
*Attorney*—Benjamin H. Sherman et al.

[57] ABSTRACT

A rack and pinion assembly, especially suitable for a vehicle steering gear, of the type having a pinion rotatably mounted in a housing meshed with the rack of a rack bar movable longitudinally through the housing wherein the pinion is radially adjusted, and in some embodiments also axially adjusted, by inexpensive plastics material, radial and thrust bearing means at one location in the housing around a free end of the pinion. The bearing means include a radial displaceable plastics ring in bearing relation with a free end portion of the pinion adjacent the pinion teeth either directly or through collars on the pinion portion. The plastics ring may be in one piece and split or may be in several segments and is sufficiently resilient to contract and expand under the influence of applied forces from an adjustable cap in the housing or means on the free end of the pinion.

16 Claims, 6 Drawing Figures

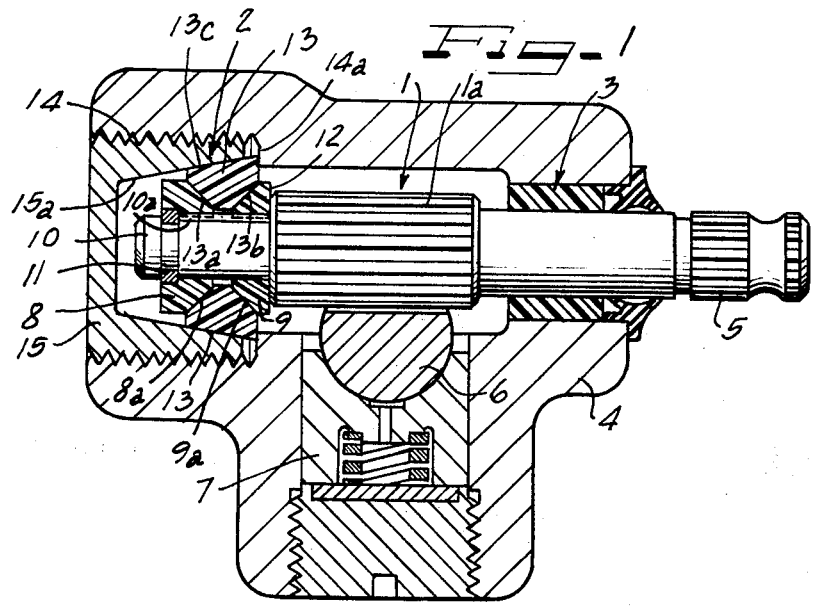
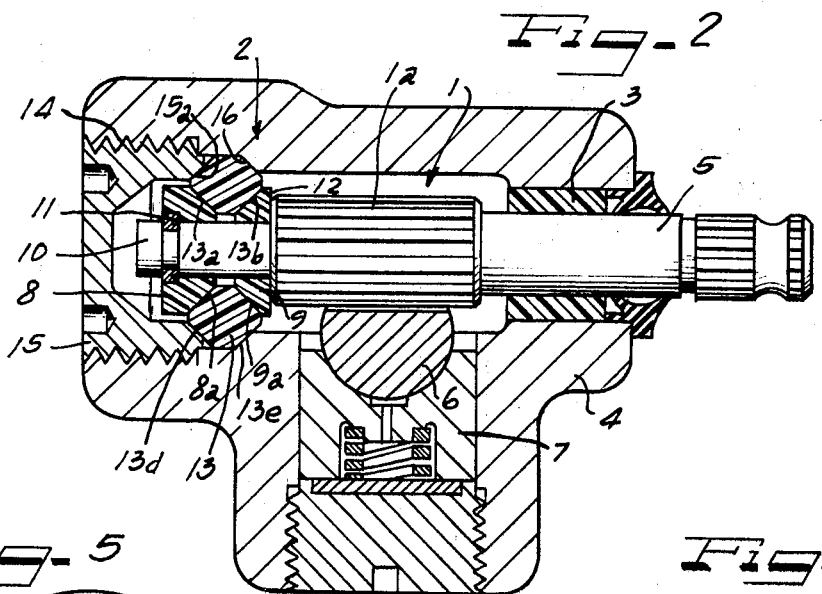
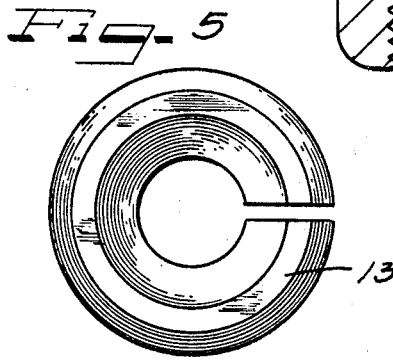
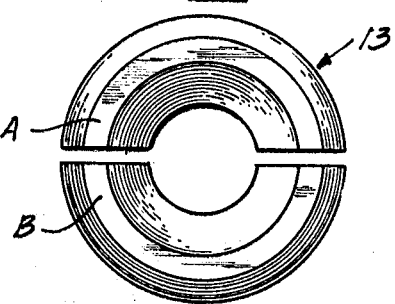

RACK AND PINION ASSEMBLY

BACKGROUND OF THE INVENTION

1. Field of the Invention

This invention relates to the art of bearing mountings and particularly to the mounting of a pinion in a housing of a rack and pinion assembly especially adapted for automotive steering gear.

2. Brief Description of the Prior Art

Rack and pinion steering assemblies for automotive steering gear are known in the art as for example in the Frederick John Adams U.S. Pat. Nos. 3,421,387; 3,554,048; and 3,572,157. In these prior art assemblies, the pinion is supported on anti-friction bearings on both sides of the pinion teeth or on a spigot and socket bearing on one side. These bearings had to cooperate to provide radial and thrust bearing support for the pinion. Adjustment was effected by movement of the bearing on one side of the pinion teeth relative to the bearing on the other side of the pinion teeth.

SUMMARY OF THE INVENTION

The present invention now provides radial and thrust support and adjustment for a pinion or the like at one location in a housing. Thus, the pinion on one side of the teeth is supported in a radial bearing which need not have any adjustment capacity while a free end portion of the pinion on the opposite side of the teeth is supported in a combined radial and thrust bearing arrangement composed of inexpensive plastics ring and collar members. The ring is arranged to be radially displaced to not only control the axis of rotation of the pinion but preferably to also provide a thrust bearing for the pinion holding it against axial shifting in the housing.

In rack and pinion assemblies where the pinion is rotatable mounted in a housing and meshed with the rack of a rack bar slidable longitudinally through the housing it is desirable that the pinion be restrained from movement in a radial direction and preferably also in an axial direction. Radial restraint is desirable to reduce backlash in the pinion on reversing the direction of longitudinal movement of the rack bar and axial restraint is desirable to elimate end play and maintain the teeth properly meshed. In prior known constructions where the pinion is rotatably mounted in anti-friction bearings that may be designed to restrain radial and axial movement of the pinion member, it is necessary for the housing and pinion to be accurately machined since after location of the bearings in the housing little, if any, adjustment in the radial direction of the pinion member is possible.

It is then an object of this invention to provide a bearing support for pinions and the like which does not require accurate seatings to hold the pinion or the like in the desired position.

Another object of the invention is to provide an improved radial and thrust bearing support in a housing for a pinion or the like which will accurately position and maintain the pinion or the like in the housing without requiring expensive machined seatings in the housing.

A still further object of the invention is to provide a rack and pinion assembly in an inexpensive housing with an adjustable plastic pinion bearing controlled by axially applied load to center the pinion as desired in the housing while restraining it from either radial or axial shifting.

A specific object of the invention is to provide a plastics pinion bearing having a contractible and expansible plastics ring with inclined faces in sliding bearing engagement with cooperating inclined faces of opposed pinion-carried plastics washers and means for contracting and expanding the ring to position the mating faces of the ring and collar for centering the pinion.

Another specific object of the invention is to provide a plastics pinion bearing affording radial and thrust support for a pinion at one location on the pinion and including means for radially adjusting the bearing to control the axis of rotation of the pinion.

A still further object of the invention is to provide a plastics pinion bearing for automotive rack and pinion steering gear which is easily adjusted to center the pinion and restrain it from radial and axial displacement in a housing without requiring accurate machining of the housing.

A still further specific object of this invention is to provide a bearing support for the pinion of a rack and pinion assembly in a housing which has a split plastics collar displaced radially by an end cap threaded in the housing and riding either directly on the pinion or on plastics washers carried by the pinion.

Another and specific object of the invention is to provide a plastics pinion bearing for rack and pinion steering gear wherein a split plastics ring has inclined faces riding on plastic collars carried by the pinion and is radially displaced by an end cap on the housing in which the pinion is mounted or by a nut on the pinion.

Other and further objects of this invention will become apparent to those skilled in this art from the following description of the annexed sheets of drawings which by way of preferred examples only illustrate several embodiments of the invention.

ON THE DRAWINGS

FIG. 1 is a cross-sectional view through a rack and pinion assembly of a rack and pinion vehicle steering gear according to this invention taken in a plane normal to the rack bar and showing the pinion in elevation wherein radial and axial location of the pinion is effected by radially inward displacement of a split ring;

FIG. 2 is a view similar to FIG. 1 showing a modified arrangement for effecting radially inward displacement of the split ring;

FIG. 5 is a plan view of the bearing ring in the bearing assembly of FIG. 1; and FIG. 6 is a view similar to FIG. 5 but illustrating a modified segmented bearing ring.

DESCRIPTION OF THE PREFERRED EMBODIMENTS

Figure 3:
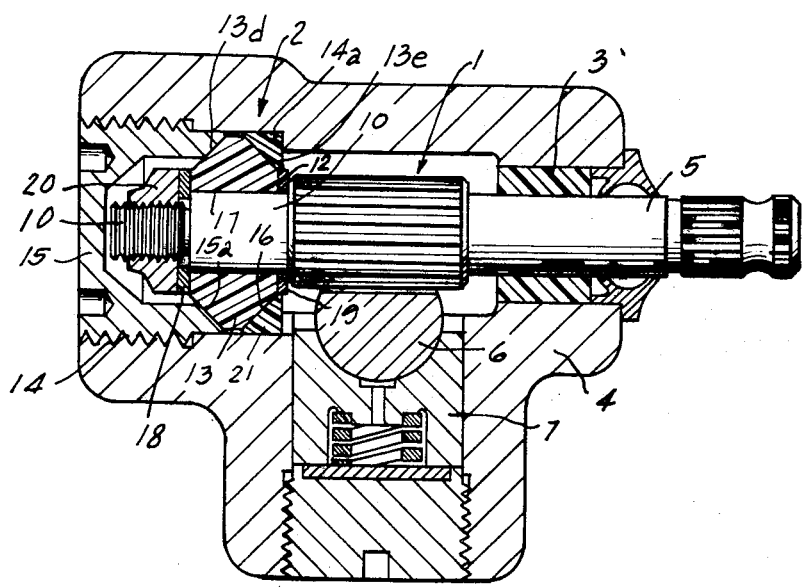
FIG. 3 is a view similar to FIG. 1 illustrating a further embodiment in which radial location only of the pinion member is effected by radially inward displacement of a split ring.

In the following description the same parts or members in each of the Figures of the drawings have been identified with the same reference numerals.

The rack and pinion assemblies of FIGS. 1 to 4 each include a pinion member 1 rotatably mounted by axially spaced bearings 2 and 3 in a pinion housing 4. These rack and pinion assemblies are particularly useful in automotive vehicle steering gear and for this purpose the pinion member 1 has a shaft portion 5 with a splined end extending from the pinion housing to be coupled for rotation by a steering wheel or the like component. The pinion 1 has axial teeth 1a meshed with the teeth of a rack bar 6 which is slidable longitudinally through the pinion housing 4 and biased into engagement with the pinion teeth by a spring-loaded yoke 7 slidably mounted in a bore of the housing and retained therein by a screw threaded plug as shown.

The bearing 3 is a conventional bronze or plastics bushing rotatably supporting the shaft portion 5 of the pinion and as shown provides only radial support for the pinion shaft portion on one side of the pinion teeth 1a.

In accordance with this invention the pinion 1 is adjustably supported on the opposite side of the pinion teeth 1a by the bearing assembly 2 which at least serves to radially locate and restrain radial movement of the pinion in the housing and may also provide thrust support locating the pinion axially in the housing.

In the embodiment of FIG. 1 the bearing assembly 2 includes two annular collars 8 and 9 mounted on a cylindrical shaft extension 10 of the pinion member 1 which is coaxial with the shaft portion 5. A snap ring 11 seated in a groove in the extension 10 provides an abutment holding the collar 8 on the extension. The collar 9 is bottomed against a shoulder 12 on the pinion. The collars 8 and 9 are in spaced opposed relation as shown and are secured on the extension 10 for corotation as by means of a longitudinal key 10a or other anchor such as a press-fit, bonding, serrations or the like, or alternately, the washers may be an integral part of the pinion member 10.

The bearing 2 also includes a ring member 13 which may be split as shown in FIG. 5 or composed of a plurality, preferably two, segments as shown in FIG. 6. The ring 13 is composed of resilient plastics material so that when it is subjected to compression in a radially inward direction it will contract to close the gap or when subjected to radially outward forces will open up to expand the gap.

The ring 13 has a pair of axially disposed frusto-conical faces 13a and 13b concentric with the pinion axis and these faces are respectively opposed and complementary to the frusto-conical faces 8a and 9a of the washers 8 and 9 with which they slidably engage.

The ring 13 is positioned in counterbore 14 of the pinion housing and extends radially to lie adjacent an internal shoulder 14a of the counterbore. The external circumference of the ring 13 is in the form of a frusto-conical face 13c concentric with the pinion axis.

A tubular end cap 15 is threaded in the counterbore 14 and has an internal tapered face 15a overlying part of the face 13c of the ring 13 in complementary relation and in slidable engagement therewith.

The collars 8 and 9 rotate with the pinion 1 while the bearing ring 13 is held stationary in the housing 4. The faces 8a and 9a of the collars 8 and 9 therefor slide over the frusto-conical faces 13a and 13b of the ring 13 during rotation of the pinion member.

The ring 13 and either or both of the collars 8 and 9 are preferably formed of low-friction plastics material such as nylon, "Teflon," a polyolefin plastic or the like.

By screw adjustment of the end cap 15 into the counterbore 14 the frusto-conical face 15a of the cap slides axially over the frusto-conical face 13c of the ring 13 which is bottomed against the shoulder 14a. As the end cap 15 is threaded into the counterbore, its face 15a will exert a radially inward directed component of force on the face 13c which will displace the ring 13 radially inward providing radially inward and axially directed components of force to the pinion 1 through the opposed frusto-conical faces at 13a and 8a and between 13b and 9a. The pinion member is therefor radially and axially located and restrained and the tightness of the bearing assembly 2 is controlled.

In constructions where the collar 8 is not removable from the pinion extension 10 the ring 13 will take the two component form shown in FIG. 6 where the separate segments A and B can be easily positioned in the tapered groove between the collars 8 and 9 unless of course the one-piece split ring 13 of FIG. 5 is sufficiently resilient to be stretched over the collar 8.

In the embodiment of FIG. 2 the bearing 2 is constructed similar to that shown in FIG. 1 except that the external peripheral surface of the split ring 13 is provided with two axially disposed frusto-conical faces 13d and 13e with their larger diameter ends located adjacent to each other. The face 13d effectively corresponds to the face 13c in the FIG. 1 embodiment and slidably engages the complementary frusto-conical internal end face 15a of the cap. The frusto-conical end face 13e, however, of the ring 13, is in axial sliding engagement with the complementary internal frusto-conical face 16 provided in the bottom of a counterbore 14 of the housing and replacing the radial shoulder 14a in the FIG. 1 embodiment. When the cap 15 is screwed into the counterbore 14 the radially inward directed components of force are applied to the ring 13 as a result of the sliding movement of the face 15a over the face 13d and the face 13e over the face 16. The bearing then functions identically with the bearing of FIG. 1 to radially position and maintain the pinion 1 while at the same time holding it against axial movement.

In the FIG. 3 embodiment, the split ring 13 has an inner peripheral surface 17 of cylindrical profile carried on the pinion extension 10 between axially spaced washers 18 and 19. The washer 19 is between the split ring 13 and the pinion shoulder 12 while the washer 18 abuts against the opposite face of the ring 13 and is retained by a nut 20 threaded on the extension 10. The external peripheral surface of the split ring is provided with two frusto-conical faces 13d and 13e slidably engaging respective complementary frusto-conical faces 15a of the end cap and 16 of a ring 21 that is bottomed on the shoulder 14a of the counterbore 14. This ring 21 is preferably composed of plastics material of the same anti-friction type used for the ring 13.

As shown in FIG 3, axial adjustment of the end cap 15 into the counterbore 13 will displace the split ring 13 radially inward in the same manner as in the FIG. 2 embodiment. In the FIG. 3 embodiment, however, radial inward displacement of the split ring 13 only imparts radially inward directed components of force to the pinion through the bearing surface 17. Although adjustment of the end cap 15 in this embodiment thus only causes the pinion to be located and restrained in a radial sense, the pinion is located in an axial sense by the nut 20, shoulder 12 and the intermediate washers 18 and 19 which restrain the pinion in either axial direction relative to the split ring 13 which in itself is restrained from axial movement by the end cap 15 and annular ring 21.

The split ring 13 in the FIG. 3 embodiment is intended to remain stationary with respect to the pinion housing so that its inner face 17 provides the radial bearing surface for the pinion member. If desired, however, the split ring 13 can be made to rotate with the pinion as by affixing it to the pinion extension 10 whereupon the frusto-conical faces 15a and 16 will provide the bearing surfaces for the faces 13d and 13e of the ring 13.

Figure 4:
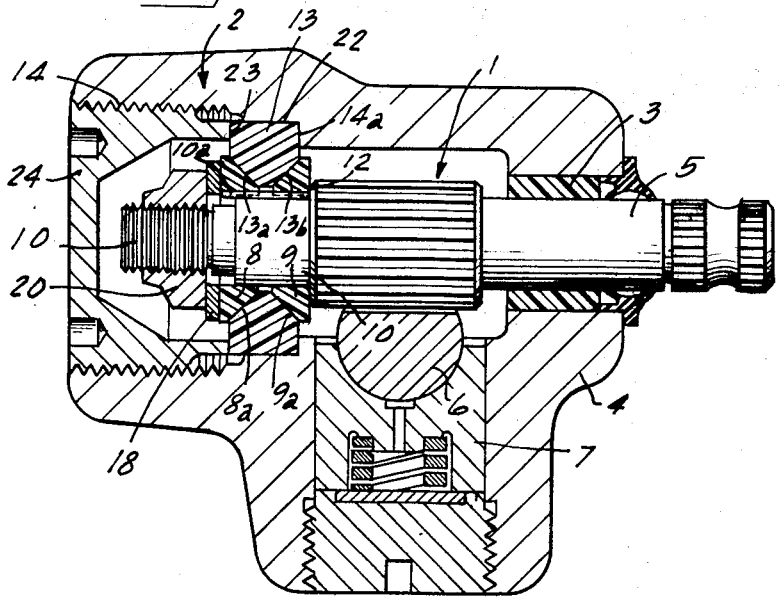
FIG. 4 is a view similar to FIG. 1 illustrating a still further embodiment in which radial and axial location of the pinion member is effected by radially outward displacement of a split ring.

In the FIG. 4 embodiment, the bearing 2 is, in substance, the converse arrangement of the bearing 2 of FIG. 3. In FIG. 4, the annular collar 8, and if desired also the annular collar 9, are mounted for axial sliding movement on the pinion extension 10 and are retained on the extension by the nut 20 acting through the washer 18. By tightening the nut against the collar 8, it is moved axially toward the collar 9 and as it so moves the frusto-conical faces 13a and 13b of the ring 13 slide over the frusto-conical faces 8a and 9a, respectively, to cause the split ring 13 to expand radially outward against the pinion housing. As shown in FIG. 4, the split ring 13 has a substantially cylindrical external peripheral face 22 concentric with the pinion axis and received in the counterbore 14 which as shown is stepped down from the threaded portion. The split ring 13 is restrained from axial movement in the counterbore by the shoulder 14a and by an annular abutment surface 23 at the inner end of a screw cap 24 threaded in the counterbore 14. The reaction of the split ring 13 against the pinion housing during its radially outward displacement results in radially inward and axially directed components of force applied on the pinion member 1 through the frusto-conical faces 8a and 9a causing the pinion member to be radially and axially located in the housing. In this FIG. 4 embodiment, it is preferred that the split ring 13 be held stationary relative to the housing between the shoulder 14a and the cap 24 while the collars 8 and 9 rotate with the pinion member.

From the above description it will be appreciated by persons skilled in the art that the amount of radial displacement required of the split ring 13 to effect radial, and also possible axial, location of the pinion member 1, in addition to loading of the bearing, will depend upon the particular characteristics of the assembly, especially the amount of clearance initially provided between the respective parts and members which are intended to cooperate. In general, however, the radial displacement of the split ring 13 will generally be of the order of thousandths of an inch. A pinion member which is radially, and possibly axially, located in accordance with this invention is restrained against substantial movement in the radial direction, and possibly either or both axial directions relative to the pinion housing.

The invention eliminates heretofore required accurately machined seatings for pinion bearings since a single bearing assembly locates and restrains the pinion as desired. The housings can be composed of metal, plastic or any structural material.

I claim as my invention:

1. A rack and pinion assembly comprising a housing, a rack bar slidable through the housing, a pinion rotatably mounted in said housing having a shaft projecting from the housing and a free end in the housing, said rack bar and pinion having teeth in meshed engagement, a radial bearing in the housing supporting the shaft, a pinion bearing in the housing supporting the free end of the pinion and locating the pinion both axially and radially in the housing, said pinion bearing including a radially expansible and contractible bearing ring means, and axially adjustable means in the housing acting on said ring means to exert a radial force for controlling the radial position of the bearing surface of the ring means to position and maintain the radial location of the pinion in the housing and an axial force for controlling and maintaining the axial position of the pinion in the housing.

2. The assembly of claim 1 wherein the bearing ring is a split plastics ring.

3. The assembly of claim 1 wherein the bearing ring is a segmented plastics ring.

4. The assembly of claim 1 wherein the adjustable means is accessible from outside the housing.

5. The assembly of claim 1 wherein the bearing ring has frusto-conical bearing faces.

6. The assembly of claim 5 wherein the frusto-conical faces of the bearing ring are external faces held between complementary faces in the housing.

7. A rack and pinion assembly comprising a housing, a rack bar slidable through the housing, a pinion rotatably mounted in the housing having a shaft projecting from the housing and a free end in the housing, said rack bar and pinion having teeth in meshed relation, a radial bearing in the housing supporting the shaft, a radially expansible and contractible bearing ring in the housing having frusto-conical bearing faces, opposed collars on the free end of the pinion slidably engaging the frusto-conical bearing faces of the bearing ring, and axially adjustable means in the housing acting on said bearing ring to control the position of the bearing surface of the ring for positioning and maintaining the radial location of the pinion in the housing.

8. A rack and pinion assembly comprising a housing, a rack bar slidable through the housing, a pinion rotatably mounted in said housing having a shaft projecting from the housing and a free end in the housing, said rack bar and pinion having teeth in meshed engagement, a radial bearing in the housing supporting the shaft, a radially expansible and contractible bearing ring in the housing having opposed frusto-conical faces on the inner periphery thereof, opposed collars secured for corotation on the free end of the pinion having frusto-conical faces riding on the frusto-conical faces of the bearing ring, and axially adjustable means in the housing acting on said bearing ring to exert a radial force thereon for controlling the position of the frusto-conical faces of the bearing ring to position and maintain the radial location of the pinion in the housing.

9. The assembly of claim 8 wherein an end cap threaded in the housing controls the diameter of the bearing ring.

10. The assembly of claim 8 wherein a nut threaded on the free end of the pinion controls the diameter of the bearing ring.

11. The assembly of claim 8 wherein the bearing ring has external tapered faces respectively engaged by an end cap threaded in the housing and a ring bottomed in the housing and the bearing ring has a cylindrical interior periphery supporting the free end of the pinion.

12. A plastics shaft bearing for locating and maintaining the position of a shaft in a housing which comprises a resiliently expansible and contractible plastics bearing ring in the housing having opposed frusto-conical bearing faces, a pair of opposed collars on the shaft having frusto-conical faces engaging on the frusto-conical faces of the bearing ring, and adjustable means in the housing exerting a force on the bearing ring to position the ring in the housing for locating the shaft both radially and axially in the housing and also tightening the bearing components.

13. The bearing of claim 12 wherein the collars are secured for corotation with the pinion.

14. The bearing of claim 12 wherein the adjustable means is a cap for the housing contracting the ring.

15. The bearing of claim 12 wherein the adjustable means is a nut on the pinion acting on a collar to expand the ring.

16. A rack and pinion assembly comprising a housing, a rack bar slidable through the housing, a pinion rotatably mounted in the housing having teeth meshed with the teeth of the rack bar, yoke means in the housing biased against the rack bar to hold the rack teeth in engagement with the pinion teeth, said pinion having a first shaft portion extending from the housing on one side of the teeth thereof and a second shaft portion terminating in the housing on the other side of the teeth, a radial bearing in the housing supporting the first shaft portion, a combination radial and thrust bearing assembly in the housing supporting the second shaft portion, said bearing assembly including an expansible and contractible bearing ring, and axially shiftable means in the housing exerting a radial component of force on said bearing ring to position and maintain the radial location of the pinion in the housing.

* * * * *